United States Patent [19]
Hashi et al.

[11] Patent Number: 5,784,229
[45] Date of Patent: Jul. 21, 1998

[54] DRIVING APPARATUS IN WHICH A DISTANCE BETWEEN A FIRST FLANGE AND A SECOND FLANGE OF A TAPE GUIDE IS LARGER THAN A DISTANCE BETWEEN A FIRST FLANGE AND A SECOND FLANGE OF A TAKE-UP REEL

[75] Inventors: Hideyuki Hashi, Kadoma; Hideaki Yoshio, Moriguchi; Kenji Matsuura; Shigeki Murata, both of Nara, all of Japan

[73] Assignee: Matsushita Electric Industrial Co., Ltd., Kadoma, Japan

[21] Appl. No.: 661,605

[22] Filed: Jun. 11, 1996

[30] Foreign Application Priority Data

Jun. 20, 1995 [JP] Japan ................................ 7-152873

[51] Int. Cl.[6] .............................................. G11B 15/60
[52] U.S. Cl. ........................ 360/130.21; 226/15; 226/190
[58] Field of Search ......................... 360/130.2, 130.21, 360/71; 226/190, 194, 196, 199, 15, 16, 196.1, 192

[56] References Cited

U.S. PATENT DOCUMENTS

| | | | |
|---|---|---|---|
| 3,756,610 | 9/1973 | Naegele et al. | 360/130.21 |
| 5,333,770 | 8/1994 | Kano et al. | 226/15 |
| 5,407,117 | 4/1995 | Yokoo et al. | 226/190 |
| 5,414,585 | 5/1995 | Saliba | 360/130.21 |

FOREIGN PATENT DOCUMENTS

| | | |
|---|---|---|
| 0365991 | 5/1990 | European Pat. Off. . |
| 0376268 | 7/1990 | European Pat. Off. . |
| 0403651 | 12/1990 | European Pat. Off. . |
| 3118241 | 11/1982 | Germany . |
| 3742828 | 7/1989 | Germany . |
| 6162624 | 6/1994 | Japan . |
| 2257560 | 1/1993 | United Kingdom . |

*Primary Examiner*—Tan Dinh
*Attorney, Agent, or Firm*—Kenner, Otto, Boisselle & Sklar, P.L.L.

[57] ABSTRACT

The present invention provides a tape driving apparatus capable of receiving a cassette tape to be mounted therein, the cassette tape including a magnetic tape and a take-up reel hub for winding the magnetic tape, the take-up reel hub having a first flange and a second flange for limiting movement of the magnetic tape along a direction of the width of the magnetic tape. The tape driving apparatus includes: a capstan for driving the magnetic tape; and a tape guide disposed in a tape travel path extending from the capstan to the take-up reel hub, the tape guide including a first flange and a second flange for limiting a travelling height of the magnetic tape, wherein a distance between the first flange and the second flange of the tape guide is larger than a distance between the first flange and the second flange of the take-up reel hub.

4 Claims, 5 Drawing Sheets

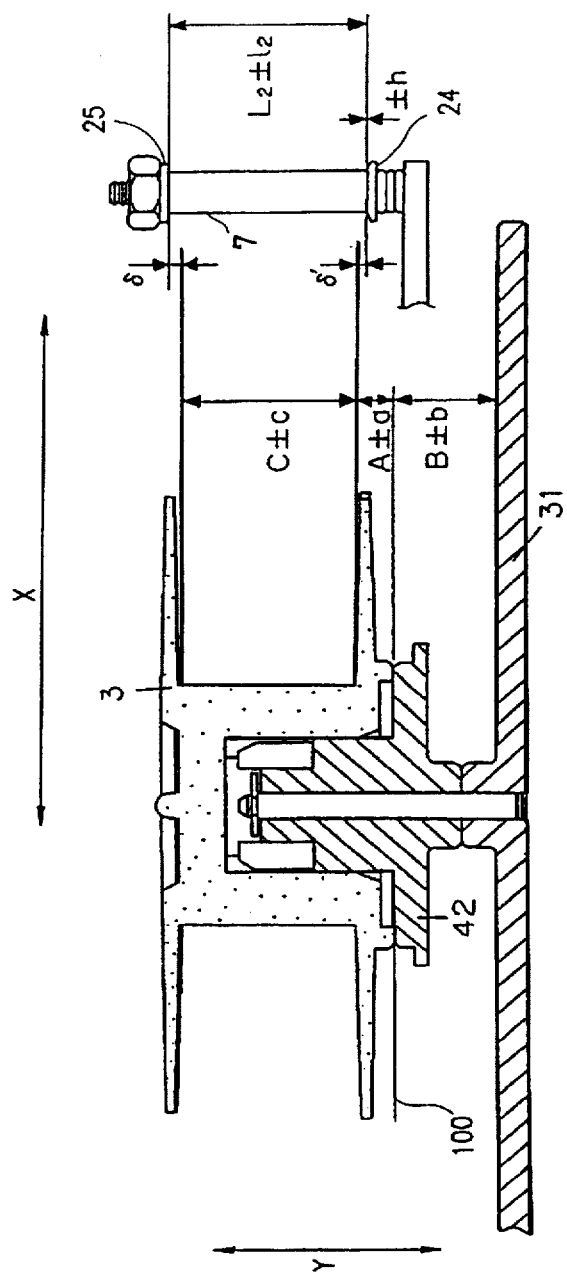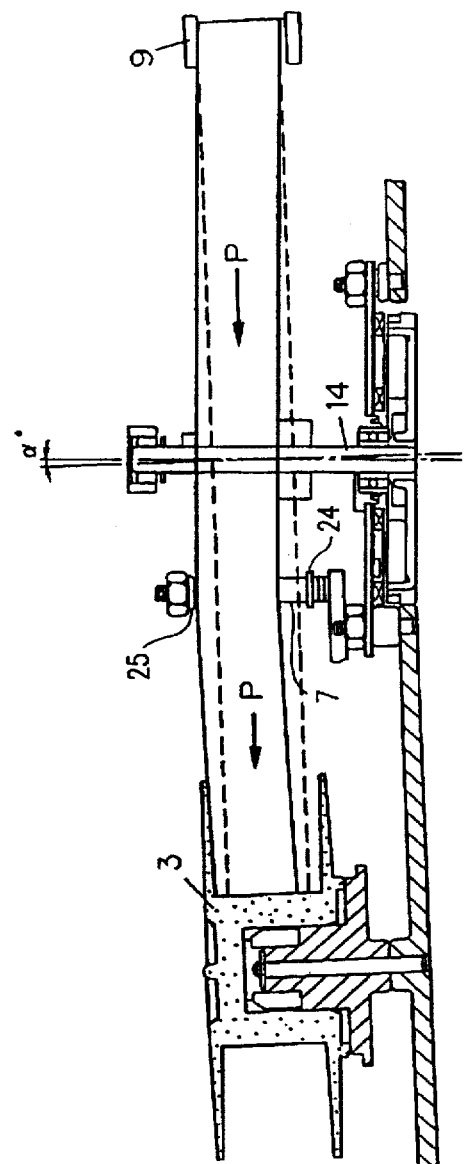
FIG. 3
FIG. 4

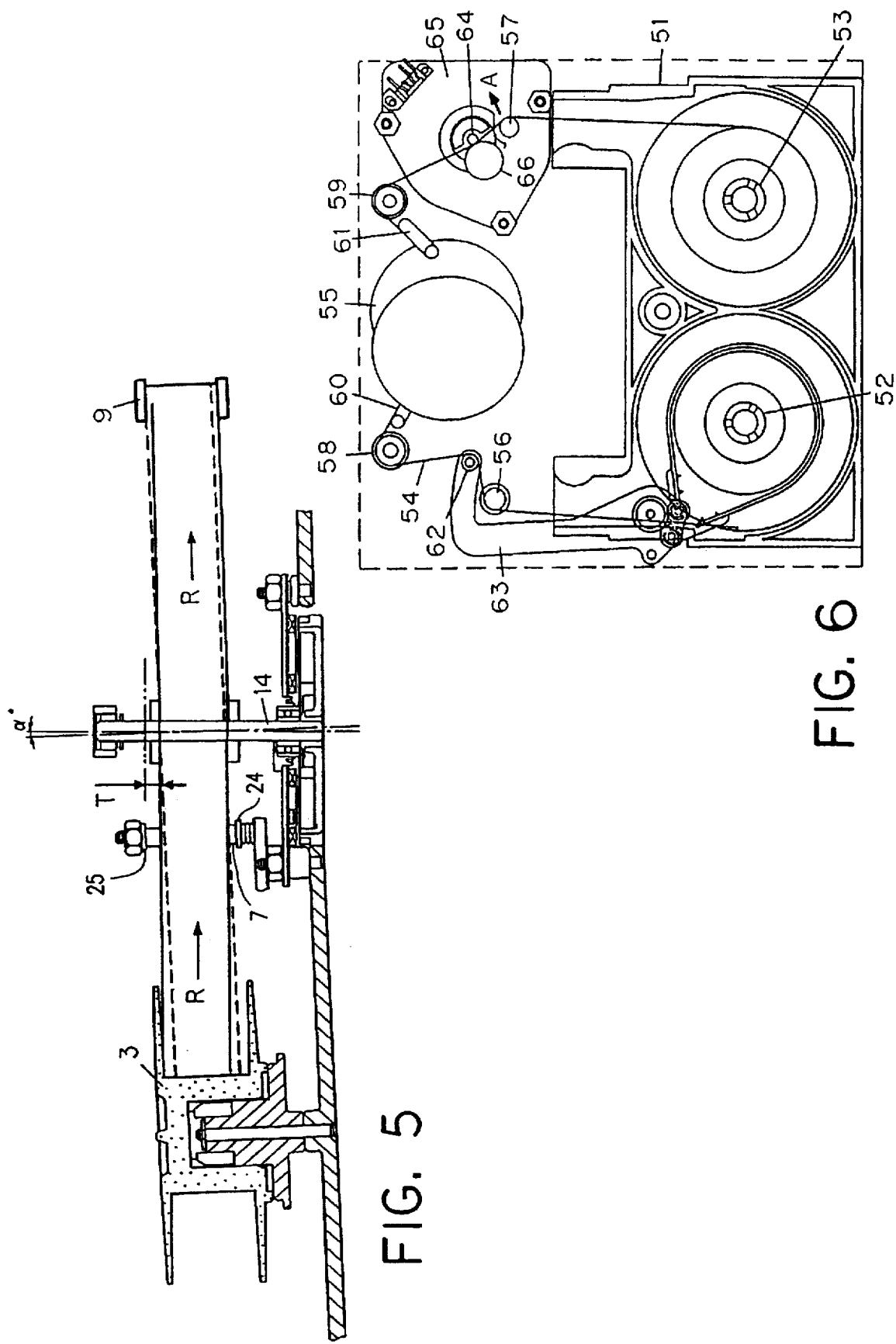

DRIVING APPARATUS IN WHICH A DISTANCE BETWEEN A FIRST FLANGE AND A SECOND FLANGE OF A TAPE GUIDE IS LARGER THAN A DISTANCE BETWEEN A FIRST FLANGE AND A SECOND FLANGE OF A TAKE-UP REEL

BACKGROUND OF THE INVENTION

1. Field of the Invention

The present invention relates to a tape driving apparatus for running a magnetic tape such as a video cassette tape.

2. Description of the Related Art

Recent years have seen a move for smaller size and weight in video movie apparatuses, backed by market demand. Hereinafter, an example of a conventional tape driving apparatus will be described with reference to the figures.

FIG. 6 is a plan view showing a conventional magnetic recording/reproduction apparatus. FIG. 6 illustrates a state when a tape has been properly loaded in the apparatus.

A cassette 51 shown in FIG. 6 includes a supply reel hub 52, a take-up reel hub 53, and a magnetic tape 54. The magnetic tape 54 extends between the supply reel hub 52 and the take-up reel hub 53, and is wound around the supply reel hub 52 and the take-up reel hub 53 enclosed in the cassette 51.

Magnetic heads (not shown) for recording and reproducing data on the magnetic tape 54 are provided on a guide drum 55. Because the upper and lower edges of the magnetic tape 54 are liable to wobble during a loading operation, etc., extension guides 56 and 57 are provided which limit the upper and lower edges of the magnetic tape 54 by means of flanges provided on upper and lower ends of the extension guides 56 and 57.

Reference numerals 58 and 59 denote rotary posts; 60 and 61 denote fixed posts; 62 denotes a tension post; and 63 denotes a tension arm. The tension post 62, which is disposed on the tension arm 63, includes a tension generation section (not shown) for providing a predetermined tension for the magnetic tape 54.

A capstan motor section 65 rotates a capstan 64. The magnetic tape 54 is sandwiched between the capstan 64 and a pinch roller 66.

FIG. 7 is a side view showing a portion of the magnetic recording/reproduction device shown in FIG. 6 extending from the capstan 64 to the take-up reel hub 53. In FIG. 7, constituent elements also appearing in FIG. 6 are indicated by the same reference numerals as used therein.

The tape guide (extension guide) 57 is attached to the chassis 81 via an extension arm 71. Specifically, the tape guide 57 is attached to the extension arm 71 via a threaded shaft 72 (which is caulked onto the extension arm 71) and a tension spring 73. The tension spring 73, a lower flange 74, the tape guide 57, and an upper flange 75 are mounted on the shaft 72 in this order. Thereafter, a nut 76 is screwed onto the shaft 72. By rotating the nut 76 so as to adjust the vertical position of the nut 76, the upper and lower flanges 75 and 74 and the tape guide 57 can be moved vertically, whereby the height of the magnetic tape 54 is adjusted.

The capstan 64 and the capstan motor section 65 are mounted on a chassis 81 via a threaded shaft 82 and a nut 83. Specifically, the capstan 64 and the capstan motor section 65 are interposed between the threaded shaft 82 (which is pressed into the chassis 81) and the nut 83.

A reel shaft 91 is pressed into the chassis 81. The reel turntable 92 rotates around the reel shaft 91. The reel turntable 92 is capable of engaging with the take-up reel hub 53 so as to rotate along with the take-up reel hub 53.

Hereinafter, an operation of this conventional magnetic recording/reproduction apparatus having the above-mentioned configuration will be described with reference to FIGS. 6 and 7.

With reference to FIG. 6, when loading the magnetic tape 54, extension posts 56, 57, 58, 59, 60, and 61 function to draw out the magnetic tape 54 from the supply reel hub 52 accommodated in the cassette 51, and wind the magnetic tape 54 helically around the guide drum 55. Thereafter, the magnetic tape 54 is sandwiched between the capstan 64 and the pinch roller 66 so as to be run at a constant speed while the upper and lower edges of the magnetic tape 54 are limited by the flanges of the extension posts 56, 57, 58, and 59. The take-up reel hub 53 in the cassette 51 gradually winds the magnetic tape 54 as the tape is sent through the capstan 64 and the pinch roller 66.

However, in the above-mentioned conventional apparatus, the travelling height of the magnetic tape 54 may fluctuate along the vertical direction as shown in FIG. 10 without adequate limitation force on the upper and lower edges of the magnetic tape 54 applied by the flanges of the tape guide 57, due to variation in the processing accuracy of component parts of a tape driving section defined by the capstan, pinch roller, and the like for driving the magnetic tape 54 in the forward or reverse direction as pinched therebetween. As a result, the magnetic tape 54 may receive a non-uniform distribution of strain along the width direction of the magnetic tape 54, thereby allowing the magnetic tape 54 to unwind near the upper or lower edge. The unwinding of the magnetic tape 54 can be withstood up to a certain degree. However, in the case where a relatively thin tape is run and there is a large degree of unwinding due to variation in the processing accuracy of component parts of the tape driving section, the unwound portion of the tape may be incorrectly sandwiched between the capstan 64 and the pinch roller 66 at the time of switching the travel of the magnetic tape from a forward direction to a reverse direction, or vice versa. This may leave a press graze on the surface of the tape, which is critically problematic.

A conventional method attempts to solve the above problem by, for example, tilting the tape guide 57 in a direction indicated by arrow A in FIG. 6, so as to cancel the decrease in the distribution of tension along the width direction of the magnetic tape 54 toward the upper edge of the tape, and at the same time rotating the nut 76 to adjust the height of the tape guide 57 so that the lower edge of the magnetic tape 54 aligns with the lower flange 74 during a forward travel of the magnetic tape 54. As a result, the magnetic tape 54 is aligned with the lower flange of the tape guide 57 not only during the forward travel but also the reverse travel of the magnetic tape 54 because of the tilt of the tape guide 57 in direction A. Thus, the same travelling height of the magnetic tape 54 (taken in the vicinity of the capstan 64) during the forward travel is substantially retained during the reverse travel of the magnetic tape 54, in spite of possible variation in the processing accuracy of component parts of the tape driving section. Thus, the travelling height of the magnetic tape 54 is prevented from fluctuating (along the vertical direction) in response to the switching of the direction of travel of the magnetic tape 54 by the capstan 64, thereby preventing the tape surface from sustaining press grazes.

Although the above-described configuration may solve the problem associated with switching of the direction of travel of the magnetic tape 54 by the capstan 64, it still allows for the following problem.

It is assumed that the magnetic tape 54 happens to be wound on the take-up reel hub 53 in the cassette 51 to be shifted toward the lowermost end of the take-up reel hub 53 as shown in FIG. 8 and loaded in that state, and that the capstan 64 runs the magnetic tape 54 in a reverse direction while pinching the magnetic tape 54 with the pinch roller 66. Then, the magnetic tape 54 will begin to travel in a direction perpendicular to the longitudinal direction of the capstan 64, as shown in FIG. 8. This can damage the lower edge of the magnetic tape 54 especially when the magnetic tape 54 is thin, because such a magnetic tape 54 may not be sufficiently stiff (against the limitation force applied to the lower edge of the magnetic tape 54 by the lower flange 74) for realigning the magnetic tape 54 between the upper and lower flanges 75 and 74 without yielding or bending near the lower flange 74.

SUMMARY OF THE INVENTION

The present invention provides a tape driving apparatus capable of receiving a cassette tape to be mounted therein, the cassette tape including a magnetic tape and a take-up reel hub for winding the magnetic tape, the take-up reel hub having a first flange and a second flange for limiting movement of the magnetic tape along a direction of the width of the magnetic tape, the tape driving apparatus including: a capstan for driving the magnetic tape; and a tape guide disposed in a tape travel path extending from the capstan to the take-up reel hub, the tape guide including a first flange and a second flange for limiting a travelling height of the magnetic tape, wherein a distance between the first flange and the second flange of the tape guide is larger than a distance between the first flange and the second flange of the take-up reel hub.

In one embodiment of the invention, a tangent of the first flange of the take-up reel hub along a longitudinal direction thereof and a tangent of the second flange of the take-up reel hub along a longitudinal direction thereof both extend between the first and second flanges of the tape guide.

In another embodiment of the invention, the tape driving apparatus further includes a first adjustor for adjusting a distance between the first and second flanges of the tape guide.

In still another embodiment of the invention, the tape driving apparatus further includes a second adjustor for tilting the capstan in either a direction in which the magnetic tape travels or in the opposite direction.

Thus, the invention described herein makes possible the advantage of providing a highly-reliable tape driving apparatus which prevents even a thin magnetic tape from being damaged during the travel thereof.

These and other advantages of the present invention will become apparent to those skilled in the art upon reading and understanding the following detailed description with reference to the accompanying figures.

BRIEF DESCRIPTION OF THE DRAWINGS

FIG. 3 is view describing the height adjustment in a tape driving apparatus according to an example of the present invention.

FIG. 4 is view describing the tape movement in a tape driving apparatus according to an example of the present invention.

FIG. 5 is view describing the tape movement in a tape driving apparatus according to an example of the present invention.

FIG. 6 is a plan view illustrating a conventional tape driving apparatus.

DESCRIPTION OF THE PREFERRED EMBODIMENTS

Hereinafter, a tape driving apparatus according to an example of the present invention will be described with reference to FIG. 1.

Figure 1:
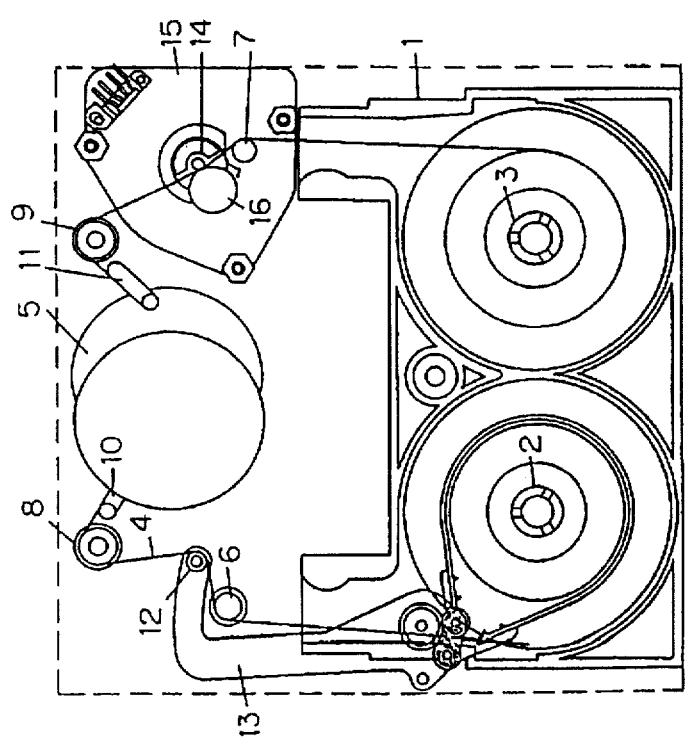
FIG. 1 is a plan view illustrating a tape driving apparatus according to an example of the present invention.

FIG. 1 is a plan view showing a magnetic recording/reproduction apparatus incorporating a tape driving apparatus of the present invention. FIG. 1 illustrates a state when a tape has been properly loaded in the apparatus. A cassette 1 shown in FIG. 1 includes a supply reel hub 2, a take-up reel hub 3, and a magnetic tape 4. The magnetic tape 4 extends between the supply reel hub 2 and the take-up reel hub 3, and is wound around the supply reel hub 2 and the take-up reel hub 3 enclosed in the cassette 1.

Magnetic heads (not shown) for recording and reproducing data on the magnetic tape 4 are provided on a guide drum 5. Because the upper and lower edges of the magnetic tape 4 are liable to wobble during a loading operation, etc., extension guides 6 and 7 are provided which limit the upper and lower edges of the magnetic tape 4 by means of flanges provided on upper and lower ends of the extension guides 6 and 7.

Reference numerals 8 and 9 denote rotary posts; 10 and 11 denote fixed posts; 12 denotes a tension post; and 13 denotes a tension arm. The tension post 12, which is disposed on the tension arm 13, includes a tension generation section (not shown) for providing a predetermined tension to the magnetic tape 4.

A capstan motor section 15 rotates a capstan 14. The magnetic tape 4 is sandwiched between the capstan 14 and a pinch roller 16.

Figure 2:
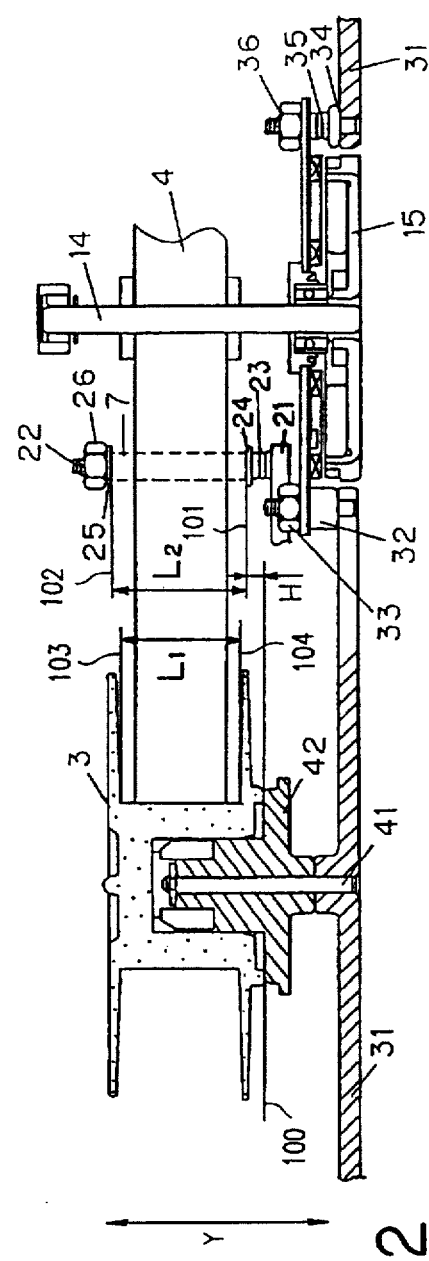
FIG. 2 is a side view illustrating a tape driving apparatus according to an example of the present invention.
Figure 7:
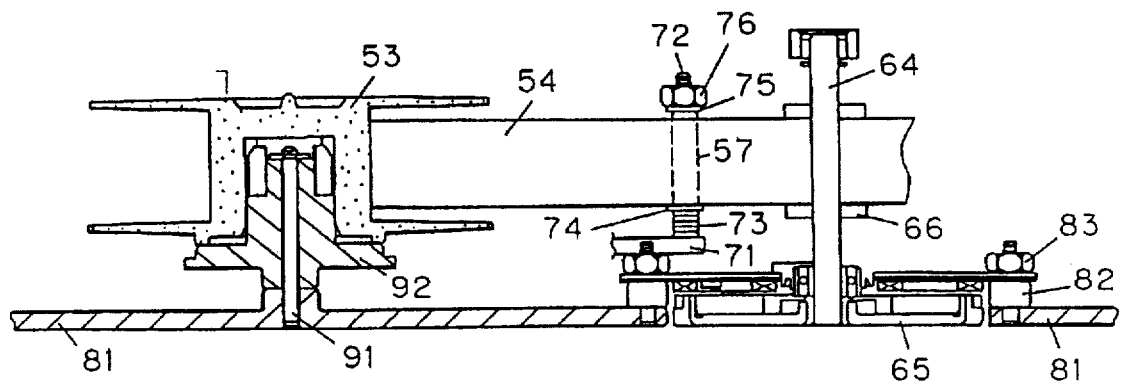
FIG. 7 is a side view illustrating a conventional tape driving apparatus.

The tape driving apparatus according to the present invention at least includes the capstan 14 for driving the magnetic tape 4 and the tape guide (extension guide) 7, which is provided in a specific position along a tape path that extends from the capstan 14 to the take-up reel hub 3 including an upper flange 25 and a lower flange 24, as shown in FIG. 2. The upper flange 25 and the lower flange 24 function to limit the height of the running magnetic tape 4.

FIG. 2 is a side view showing a portion of the magnetic recording/reproduction device shown in FIG. 1 extending from the capstan 14 to the take-up reel hub 3.

In FIG. 2, constituent elements also appearing in FIG. 1 are indicated by the same reference numerals as used therein. The capstan 14 and the capstan motor section 15 are mounted on a chassis 31 via a threaded shaft 32 (which is pressed into the chassis 31), a nut 33, a recoil spring 35, a threaded shaft 34 (which is pressed into the chassis 31), a nut 36, and the like.

The threaded shaft 34 is pressed into the chassis 31; the recoil spring 35 is mounted on the threaded shaft 34; the capstan motor section 15 is mounted on the shaft 34; then, the nut 36 is screwed onto the shaft 34.

By rotating the nut 36, which is an optional element of the present invention, the capstan 14 can be tilted along the direction of travel of the magnetic tape 4 (corresponding to the X direction in FIG. 2), as described later. The angle of the capstan 14 is preferably made substantially orthogonal with respect to a reference surface of the chassis 31 by rotating the nut 36. More preferably, the angle of the capstan 14 is made substantially orthogonal (i.e., at a right angle) with respect to a reference surface 100 present between the take-up reel hub 3 and a reel turntable 42, by rotating the nut 36.

A reel shaft 41 is pressed into the chassis 31. The reel turntable 42 rotates around the reel shaft 41. The reel turntable 42 is capable of engaging with the take-up reel hub 3 so as to rotate along with the take-up reel hub 3.

The tape guide 7 is attached to the chassis 31 via an extension arm 21. Specifically, the tape guide 7 is attached to the extension arm 21 via a threaded shaft 22 (which is caulked onto the extension arm 21) and a tension spring 23. The tension spring 23, the lower flange 24, the tape guide 7, and the upper flange 25 are mounted on the shaft 22 in this order. Thereafter, a nut 26 is screwed onto the shaft 22. By rotating the nut 26 so as to adjust the vertical position of the nut 26, the upper and lower flanges 25 and 24 and the tape guide 7 can be moved vertically (or along the Y direction in FIG. 2). Thus, the respective positions of the upper and lower flanges 25 and 24 and the tape guide 7 along the Y direction can be adjusted by means of the nut 26.

In FIG. 2, $L_1$ denotes a distance between the upper and lower flanges of the take-up reel hub 3. $L_2$ denotes a distance between a face of the lower flange 24 contacting with the magnetic tape 4 and a face of the upper flange 25 contacting with the magnetic tape 4. The values of $L_1$ and $L_2$ are prescribed to satisfy the relationship $L_1 < L_2$. Furthermore, H denotes a distance between a plane 100 on which the reel turntable 42 contacts with the take-up reel hub 3 and a face 101 of the lower flange 24 contacting with the magnetic tape 4. The value of H is prescribed so that the following two relationships are satisfied: (i) the height (taken along the Y direction) of a face 102 of the upper flange 25 contacting with the magnetic tape 4 is larger than the height (taken along the Y direction) of a face 103 of the upper flange of the take-up reel hub 3 contacting with the magnetic tape 4; and (ii) the height (taken along the Y direction) of the tape-contacting face 101 of the lower flange 24 is smaller than the height (taken along the Y direction) of a face 104 of the lower flange of the take-up reel hub 3 contacting with the magnetic tape 4. The distance H between the plane 100 (on which the reel turntable 42 contacts with the take-up reel hub 3) and the tape-contacting face 101 of the lower flange 24 can be adjusted by rotating the nut 26.

Hereinafter, an operation of the tape driving apparatus according to the present invention having the above-mentioned configuration will be described with reference to FIGS. 1 and 2.

With reference to FIG. 1, when loading the magnetic tape 4, extension posts 6, 7, 8, 9, 10, and 11 function to draw out the magnetic tape 4 from the supply reel hub 2 accommodated in the cassette 1, and winds the magnetic tape 4 helically around the guide drum 5. Thereafter, the magnetic tape 4 is sandwiched between the capstan 14 and the pinch roller 16. The capstan 14 rotates so that the magnetic tape 4 travels at a speed corresponding to the rotation speed of the capstan 14. Consequently, the magnetic tape 4 can be run at a constant or varying speed, in accordance with the rotation speed of the capstan 14. The take-up reel hub 3 in the cassette 1 gradually winds the magnetic tape 4 as the tape is sent through the capstan 14 and the pinch roller 16.

Although the capstan 14, the pinch roller 16, and the take-up reel hub 3 are shown to be generally located on the right side in FIG. 1 while the supply reel hub 2 is shown to be generally located on the left side, the present invention also encompasses a configuration in which such component elements take opposite locations.

Figure 8:
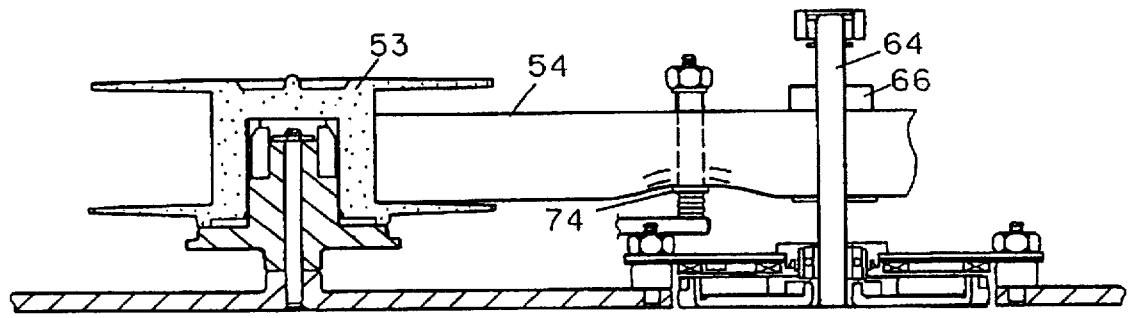
FIG. 8 is another side view illustrating a conventional tape driving apparatus.

As described above, the tape-contacting face 102 of the upper flange 25 is located higher (along the Y direction) than the tape-contacting face 103 of the upper flange of the take-up reel hub 3, and the tape-contacting face 101 of the lower flange 24 is located lower (along the Y direction) than the tape-contacting face 104 of the lower flange of the take-up reel hub 3. Therefore, even in the case where the magnetic tape 4 is wound around the take-up reel hub 3 so that the magnetic tape 4 is shifted toward the lowermost end of the take-up reel hub 3 as shown in FIG. 8, the magnetic tape 4 does not contact with the lower flange 24 when the capstan 14 switches the travel of the magnetic tape 4 from the forward direction to the reverse direction, or vice versa. Similarly, even if the magnetic tape 4 is shifted toward the upper most end on the take-up reel hub 3, the magnetic tape 4 does not contact with the upper flange 25 when the capstan 14 switches the travel of the magnetic tape 4 from the forward direction to the reverse direction, or vice versa.

Even if there is some contact between the magnetic tape 4 and the flange 24 or 25 due to variation in the processing accuracy of component parts of the apparatus, the force of contact between the magnetic tape 4 and the flange 24 or 25 is very small. In either case, the magnetic tape 4 is effectively prevented from being damaged by contact with the flange 24 or 25 in the manner described in FIG. 8. The present invention is also effective in the case where the magnetic tape 4 is relatively thin.

The height of the lower flange 24 (along Y direction) is preferably adjusted relative to the plane 100 (on which the reel turntable 42 contacts with the take-up reel hub 3) as a reference plane for the following reasons:

In general, component parts of a tape driving apparatus are positioned relative to a chassis of the apparatus used as a reference plane. However, the chassis-basis positioning tends to result in a larger value of ((A) distance between the flanges 25 and 24)−((B) width of the magnetic tape 4), due to variation in the processing accuracy of the reel turntable 42, as compared with the preferred positioning on the basis of the plane 100.

FIG. 3 is a magnified view showing the vicinity of the take-up reel hub 3 and the extension post 7 shown in FIG. 2.

In FIG. 3, A represents the distance between the plane 100 (on which the reel turntable 42 contacts with the take-up reel hub 3) and the lower flange of the take-up reel hub 3, while a represents a possible variation thereof. B represents the height (distance) between a reference face of the chassis 31 and the plane 100, while b represents a possible variation thereof. C represents the distance between the upper and lower flanges of the take-up reel hub 3, while c represents a possible variation thereof. $L_2$ represents the distance between the flanges 24 and 25, while $l_2$ represents a possible variation thereof. h represents a possible variation in the adjusted position of the lower flange 24 as adjusted by the nut 26. δ' represents a difference in height (along Y direction) between the lower flange of the take-up reel hub 3 and the lower flange 24. δ represents a difference in height (along Y direction) between the upper flange of the take-up reel hub 3 and the upper flange 25. It should be noted that δ and δ' each represents a tape margin, i.e., the minimum dimension for preventing the magnetic tape 4 from being damaged by friction at the flange 25 or 24. The values of δ and δ' vary depending on the thickness of the magnetic tape 4, the tilt angle of the capstan 14 along the direction of travel of the magnetic tape 4 (corresponding to the X direction in FIG. 3), and the like. For example, a smaller thickness of the magnetic tape 4 requires larger values of δ and δ' for preventing the magnetic tape 4 from contacting with the flange 25 or 24.

The dimension $L_2$ (including its possible variation $l_2$) results in the following values, depending on whether the height of the lower flange 24 is adjusted relative to the chassis 31 or relative to the plane 100:

On the basis of the chassis 31:

$$L_2 = C + 2a + 2b + c + \delta + \delta' + 2h$$

On the basis of the plane 100:

$$L_2 = C + 2a + c + \delta + \delta' + 2h$$

As seen from above, the dimension $L_2$ does not include the variation amount $2b$ in the case where the lower flange 24 is positioned relative to the plane 100, on which the reel turntable 42 contacts with the take-up reel hub 3. This makes it unnecessary to set the distance $L_2$ between the flanges 24 and 25 at an excessively large value.

Thus, the fluctuation of the magnetic tape 4 (along the Y direction) occurring on the take-up reel hub 3 side of the apparatus when drawing out the magnetic tape 4 from the cassette 1 can be minimized.

As described above, when the cassette 1 has been completely loaded, the magnetic tape 4 is sufficiently accurately positioned in the vicinity of the capstan 14 along the width direction (i.e., the Y direction) of the magnetic tape 4, without requiring an unduly high processing accuracy of component parts of the tape driving apparatus.

Thus, according to the present invention, the magnetic tape 4 is prevented from sustaining press grazes on its surface due to unwinding of the tape, which would otherwise occur when the magnetic tape 4 begins travelling while pinched between the capstan 14 and the pinch roller 16, which is pressed against the pinch capstan 14.

In a further aspect of the invention, the tape driving apparatus can include a section for adjusting the tilt angle of the capstan 14 along the direction of tape travel, e.g., the nut 36, because the capstan 14 may tilt with respect to the normal line of the reference face of the chassis 31 due to variation in the processing accuracy of various component parts. Such a section (hereinafter referred to as an "adjustor") can minimize variation in the height of the magnetic tape 4 during travel (hereinafter referred to as the "travelling height") in the vicinity of the capstan 14, occurring especially when the direction of tape travel is switched from the forward direction to the reverse direction, or vice versa. The function of the adjustor will now be described below with reference to FIGS. 4 and 5.

FIGS. 4 and 5 show manners in which the magnetic tape 4 travels in the case where the capstan 14 is tilted by an angle (tilt angle) of α° with respect to the normal line of the chassis 31 along the direction of tape travel. Specifically, FIG. 4 shows the tape travel in the forward direction, and FIG. 5 shows the tape travel in the reverse direction. Arrow P in FIG. 4 illustrates the movement of the magnetic tape 4 travelling in the forward direction, and arrow R in FIG. 5 illustrates the movement of the magnetic tape 4 travelling in the reverse direction.

While the magnetic tape 4 is pinched between the capstan 14 and the pinch roller 16, the magnetic tape 4 travels in accordance with the rotation of the capstan 14. In other words, the capstan 14 lies at an angle of approximately 90° with respect to the longitudinal direction of the magnetic tape 4 (corresponding to the X direction in the figure).

Prescribing the distance between the flanges 25 and 24 of the tape guide 7 to be larger than the distance between the flanges of the take-up reel hub 3 as shown in FIG. 5, etc., causes the difference T between the travelling heights of the magnetic tape 4 during a forward travel and a reverse travel (taken in the vicinity of the capstan 14) to increase if the capstan 14 has some tilt, thereby possibly damaging the magnetic tape 4. The same problem can occur in the case where the capstan 14 is tilted in the opposite direction. The travelling height of the magnetic tape 4 in the vicinity of the capstan 14 vary between U and U' shown in FIG. 10, for example, especially at the moment when the capstan 14 switches the travel of the magnetic tape 4 from the forward direction to the reverse direction, or vice versa.

The dotted lines in FIGS. 4 and 5 illustrate the trajectories of the magnetic tape 4 in the case where α equals 0°. As shown by the dotted lines, the difference T between the travelling heights of the magnetic tape 4 during a forward travel and a reverse travel is substantially zero when α equals 0°, indicating that the magnetic tape 4 sustains no damage through contact with the flanges.

The tilt angle of the capstan 14 along the direction of tape travel can be adjusted to be substantially 0° by using an adjustor (e.g., the nut 36). By thus optimizing the tilt angle of the capstan 14 along the direction of tape travel, it becomes possible to minimize the difference T between the travelling heights of the magnetic tape 4 during a forward travel and a reverse travel (taken in the vicinity of the capstan 14), occurring especially when the capstan 14 switches the travel of the magnetic tape 4 from the forward direction to the reverse direction, or vice versa. Thus, the magnetic tape 4 is prevented from unwinding in the vicinity of the capstan 14 when capstan 14 switches the travel of the magnetic tape 4 from the forward direction to the reverse direction, or vice versa. As a result, the tape surface is prevented from sustaining press grazes so that a highly reliable tape driving apparatus is provided.

Although the tilt angle of the capstan 14 is adjusted with respect to the chassis 31 in the above example, the tilt angle of the capstan 14 is preferably adjusted with respect to the plane 100, on which the reel turntable 42 contacts with the take-up reel hub 3.

Figure 10:
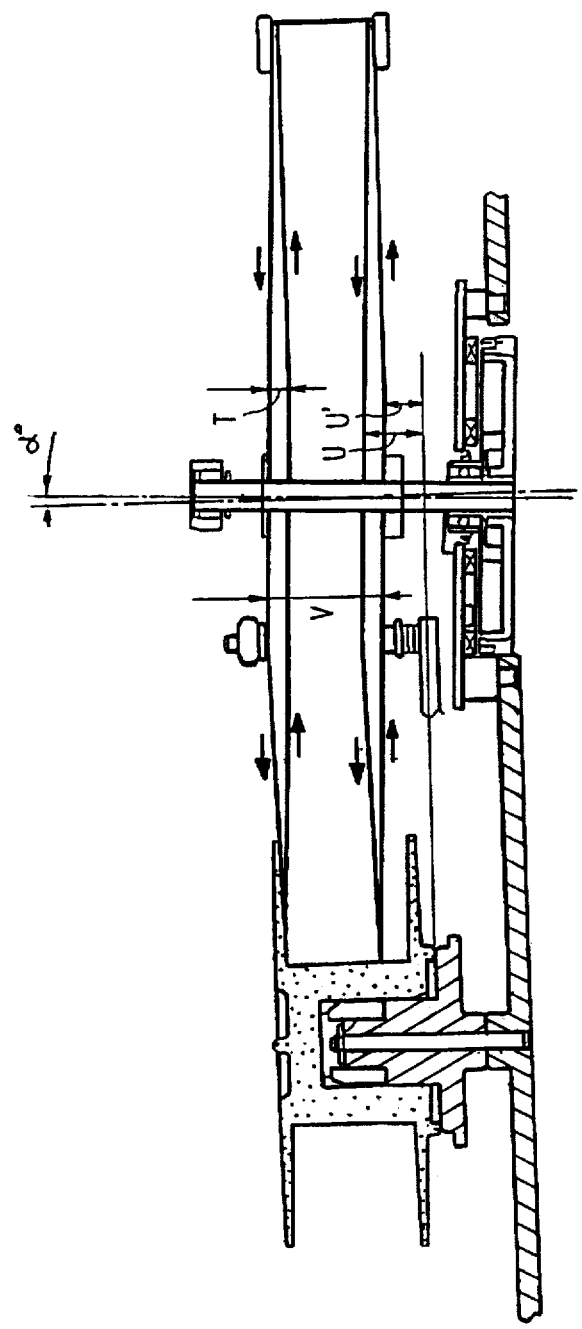
FIG. 10 is a side view illustrating a tape driving apparatus.

As used herein, the "travelling height" of the magnetic tape 4 is defined as the height of either the upper edge or the lower edge of the magnetic tape 4. In FIG. 10, for example, the distances U and U' from the reference plane 100 to the lower edge of the magnetic tape 4 define the travelling heights of the magnetic tape 4. In FIG. 10, U—U' defines the difference T between the travelling heights of the magnetic tape 4 during a forward travel and a reverse travel.

Figure 11:
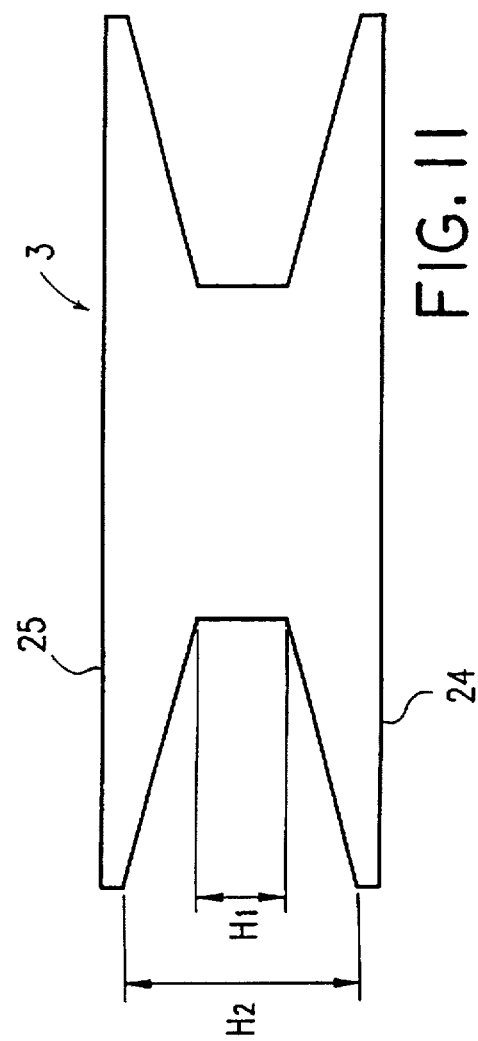
FIG. 11 is a view showing an exemplary take-up reel hub of a cassette tape.

As used herein, the "distance between the upper flange and the lower flange of the take-up reel hub 3" refers to the shortest distance $H_1$ taken between the upper flange and the lower flange of the take-up reel hub 3, as shown in FIG. 11. In the case where a cassette including the take-up reel hub 3 is installed in the tape driving apparatus of the present invention, the flanges of the take-up reel hub 3 being tapered as illustrated, the distance between the upper and lower flanges 25 and 24 of the tape guide 7 is required to be larger than the "distance ($H_1$) between the upper flange and the lower flange of the take-up reel hub 3", but may be shorter than the longest distance $H_2$ between the flanges of the take-up reel hub 3 according to the present invention, for example.

Although the plane 100 (on which the reel turntable 42 contacts with the take-up reel hub 3) was conveniently described as more preferable to the chassis 31 as a positioning reference, any plane associated with the take-up reel hub 3 can be similarly preferably used as a positioning reference, e.g., the plane on which the upper flange of the take-up reel hub 3 extends.

Although the lower flange 24 is used as a reference for positioning in the above example, the same effect can also be attained by using the upper flange 25 as a reference.

As for the tape driving system, the present invention is not limited to the particular tape driving system illustrated in FIGS. 1 to 5. The same effect can also be attained by providing a plurality of posts between the capstan 14 and the take-up reel hub 3.

Figure 9:
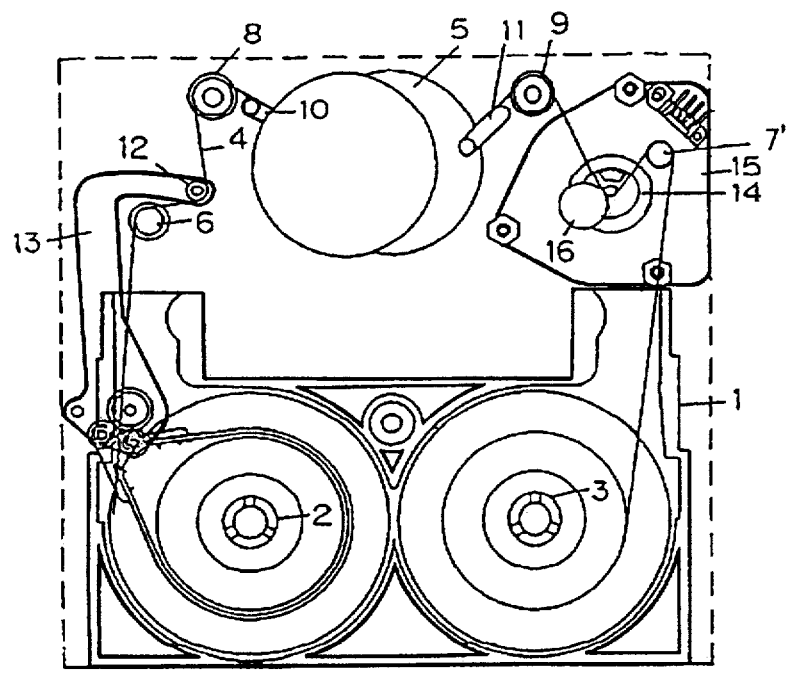
FIG. 9 is view describing the height adjustment in a tape driving apparatus according to an example of the present invention.

It is not required to dispose the extension guide (tape guide) 7 in the specific position between the capstan 14 and the take-up reel hub 3 illustrated in FIG. 1. For example, as shown in FIG. 9, a tape guide 7' can be disposed at any appropriate position in the tape path from the capstan 14 to the take-up reel hub 3.

Although the magnetic tape 4 was run while being pinched between the capstan 14 and the pinch roller 16 in the above example, the present invention is not limited thereto. For example, it is also applicable to run the magnetic tape 4 by only using the capstan 14, in which case the magnetic tape 4 should be wound around the capstan 14 over a larger angle than in the above-described example.

In the above example, the magnetic tape 4 is pinched between the capstan 14 and the pinch roller 16 not only in the forward direction but also in the reverse direction. However, the present invention provides the same effect in the case where the pinch roller 16 is not pressed against the magnetic tape 4 in the reverse direction.

Thus, according to the present invention, the magnetic tape hardly contacts with flanges. Therefore, a highly-reliable tape driving apparatus is provided which prevents even a thin magnetic tape from being damaged during the travel thereof.

Moreover, according to the present invention, it is possible to minimize the difference in the travelling heights of the magnetic tape during a forward travel and a reverse travel in the vicinity of the capstan, thereby minimizing the occurrence and magnitude of unwinding of the tape when the capstan switches from a forward travel to a reverse travel, or vice versa. As a result, the tape surface is effectively prevented from sustaining press grazes due to unwinding, whereby a highly reliable tape driving apparatus is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tape driving apparatus for receiving a cassette tape to be mounted therein, the cassette tape including a magnetic tape and a take-up reel hub for winding the magnetic tape, the take-up reel hub having a first flange and a second flange for limiting movement of the magnetic tape along a direction of the width of the magnetic tape, the tape driving apparatus comprising:

a capstan for driving the magnetic tape; and a tape guide disposed in a tape travel path extending from the capstan to the take-up reel hub, the tape guide including a first flange and a second flange for limiting a travelling height of the magnetic tape, wherein a distance between the first flange and the second flange of the tape guide is larger than a distance between the first flange and the second flange of the take-up reel hub.

2. A tape driving apparatus according to claim 1, wherein a tangent of the first flange of the take-up reel hub along a longitudinal direction thereof and a tangent of the second flange of the take-up reel hub along a longitudinal direction thereof both extend between the first and second flanges of the tape guide.

3. A tape driving apparatus according to claim 1 further comprising a first adjustor for adjusting a distance between the first and second flanges of the tape guide.

4. A tape driving apparatus according to claim 1 further comprising a second adjustor for tilting the capstan in at least one of a direction in which the magnetic tape travels and in the opposite direction.

* * * * *